United States Patent [19]

Schnell

[11] Patent Number: 4,711,472
[45] Date of Patent: Dec. 8, 1987

[54] CONNECTOR FOR NON-METALLIC CONDUIT

[75] Inventor: Kenneth R. Schnell, South Bend, Ind.

[73] Assignee: Hubbell Incorporated, Orange, Conn.

[21] Appl. No.: 902,580

[22] Filed: Sep. 2, 1986

[51] Int. Cl.[4] .............................................. F16L 5/00
[52] U.S. Cl. ..................................... 285/162; 285/319;
285/423; 285/903; 285/921; 285/906; 174/65 R
[58] Field of Search ............... 285/162, 903, 906, 921,
285/322, 323, 343, 423, 319; 174/65 R, 65 G,
153 G

[56] References Cited

U.S. PATENT DOCUMENTS

| | | | |
|---|---|---|---|
| 442,837 | 12/1890 | Ward | 285/319 |
| 3,460,859 | 8/1969 | Keating | 285/319 |
| 3,814,467 | 6/1974 | Van Buren | 285/162 X |
| 3,933,378 | 1/1976 | Sandford et al. | 285/319 |
| 4,012,578 | 3/1977 | Moran et al. | 174/65 R |
| 4,032,178 | 6/1977 | Neuroth | 285/921 X |
| 4,247,136 | 1/1981 | Fouss et al. | 285/421 X |
| 4,286,808 | 9/1981 | Fouss | 285/921 X |
| 4,441,745 | 4/1984 | Nicholas | 285/903 X |
| 4,468,535 | 8/1964 | Law | 285/162 X |
| 4,575,133 | 3/1986 | Nattel | 285/319 |

*Primary Examiner*—Dave W. Arola
*Attorney, Agent, or Firm*—Jerry M. Presson; Walter C. Farley

[57] ABSTRACT

A connector for firmly engaging the exterior annular ribs on non-metallic conduit includes a tubular sleeve with a stop wall at one end, the stop wall having an opening therethrough. Several latch tabs are formed in the side wall of the sleeve, the tabs being inclined inwardly so that the ends of them extend into the interior of the sleeve. When a piece of conduit is inserted until it abuts the stop wall, the tabs snap into recesses adjacent the end rings. On the other side of the stop wall are hook members to engage the opening in a junction box or an identical sleeve for engaging a second piece of conduit.

3 Claims, 10 Drawing Figures

4,711,472

CONNECTOR FOR NON-METALLIC CONDUIT

SPECIFICATION

This invention relates to a connector for non-metallic electrical conduit and, more specifically, to a one-piece connector to hold ribbed plastic conduit to a wall or to another piece of conduit.

BACKGROUND OF THE INVENTION

Non-metallic conduit for electrical wiring is made with external ribs or rings and can be essentially rigid or somewhat flexible. As with metal flexible or solid conduit, one must be able to attach mechanically a length of the conduit to a connection box so that wires passing through the conduit can be connected to other wires or to an electrical device in the box. It is also desirable to be able to join mechanically lengths of conduit end-to-end.

The prior art devices for this purpose involve two or three pieces which go around the conduit and generally snap together. The conduit itself is made with annular protrusion and recesses on its exterior surface, the protrusions or rings being uniformly spaced along the conduit. Depending upon various factors, the conduit usually has about 84 to 92 rings per foot of conduit length. In the prior art connectors, one or more of the mating pieces contains a web which is designed to fit in a depression of the conduit between two adjacent rings. When the fitting parts are snapped together, the web in the depression holds the conduit in the fitting which can be either a connector which will connect the conduit to a box or a coupling which joins two pieces of conduit. Some of the connector type fittings do not require an additional piece to hold them together. The mating halves are brought together and inserted into a hole in the electrical box which holds them together. In other types, lock nuts are used to hold the mating components together.

These connectors have some disadvantages such as the difficulty of installation, particularly in cold weather. It is difficult to handle, manipulate and align the mating pieces when it is cold. It is also very easy to loose a mating piece.

BRIEF SUMMARY OF THE INVENTION

Accordingly, an object of the present invention is to provide a one-piece connector which snaps onto the end of plastic conduit to hold it to a wall or to another piece of conduit.

A further object is to provide such a connector which is easy to handle and install and which is less expensive to manufacture, having only one piece.

Briefly described, the invention comprises a connector for attaching non-metallic conduit to a wall or to another conduit, the non-metallic conduit being of the type having an exterior surface characterized by a plurality of alternating annular protrusions and recesses. The connector comprises a cylindrical sleeve having an inner diameter slightly larger than the external diameter of the conduit and an axial length at least as great as the axial length occupied by three of the annular protrusions on the conduit. A stop wall is provided at one end of the sleeve for limiting the insertion depth of the conduit into the sleeve, the stop wall having a central opening therethrough to permit the passage of wires from within the conduit. A latch is formed in the sleeve wall, the latch having means defining a generally U-shaped slot through the wall of the sleeve, the ends of the slot pointing axially away from the stop wall, the slot forming a resilient latch tab in the wall of the sleeve. The tab is inclined inwardly from the surrounding sleeve wall so that the distal end of the tab engages a protrusion at the end of a piece of inserted conduit and resists extraction of the conduit from the sleeve.

The sleeve, stop wall and latch tab are all unitarily formed, preferably by molding.

BRIEF DESCRIPTION OF THE DRAWINGS

In order to impart full understanding of the manner in which these and other objectives are attained in accordance with the invention, particularly advantageous embodiments thereof will be described with references to the accompanying drawings, which form a part of the specification and wherein.

DESCRIPTION OF THE PREFERRED EMBODIMENTS

Figure 1:
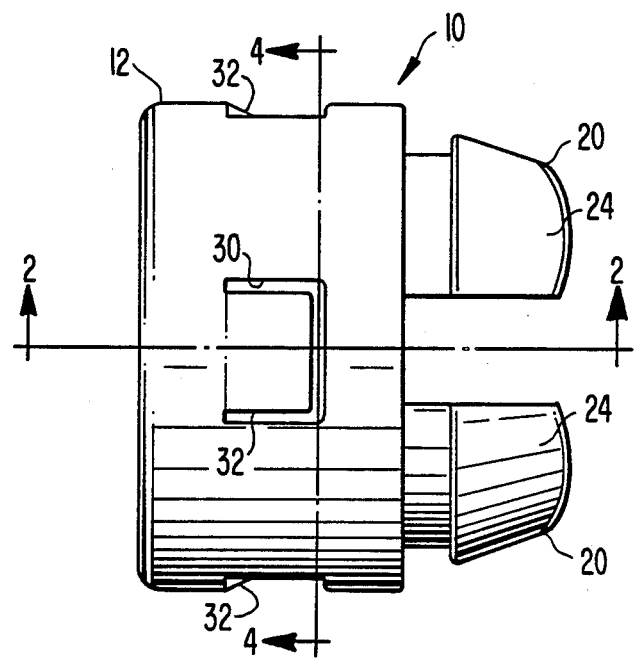
FIG. 1 is a side elevation of a connector in accordance with the invention.
Figure 2:
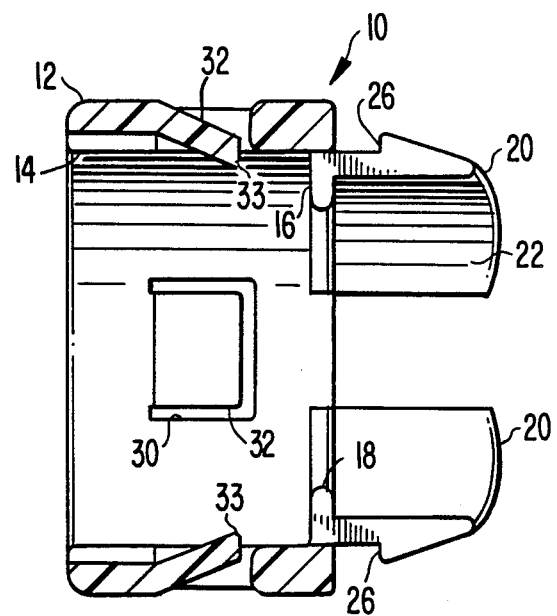
FIG. 2 is a longitudinal section along line 2—2 of FIG. 1.

Referring first to FIGS. 1 and 2, it will be seen that the connector indicated generally at 10 includes a generally cylindrical sleeve portion 12 having a generally smooth inner cylindrical surface 14. The inner diameter of the sleeve portion is just slightly larger than the exterior diameter of the conduit with which it is to be used.

Figure 5:
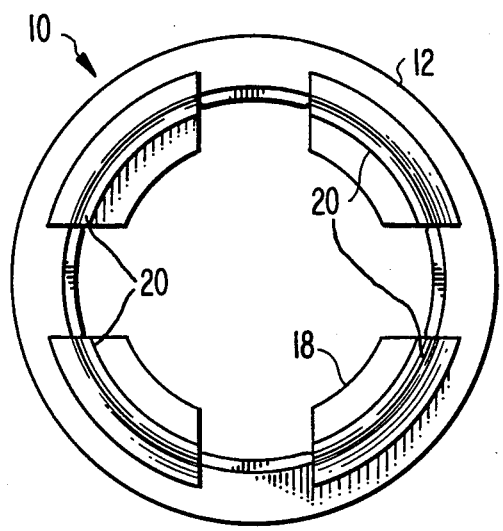
FIG. 5 is a right end elevation of the connector of FIG. 1.

One end of sleeve 12 is open and the other end is partly closed by four radially inwardly extending segments which together form a stop wall 16 which has a central opening 18. The purpose of wall 16 is to provide an abutment to limit the insertion depth of the conduit and to cooperate with the latching means. On the other side of wall 16 are four axially extending resilient walls 20, each of walls 20 being curved, as best seen in FIG. 5, and being substantially concentric with opening 18. Each wall 20 subtends an angle of about 80° and has a smooth interior wall 22 and a hook-like outer configuration formed by an inclined wall 24 which slopes outwardly away from the distal end of the wall. The inclined surface terminates at a radial wall portion 26, all of the radial walls together forming an annular recess between radial portions 26 and the outer side of stop wall 16 to receive the wall of a junction or outlet box or the like.

Figure 3:
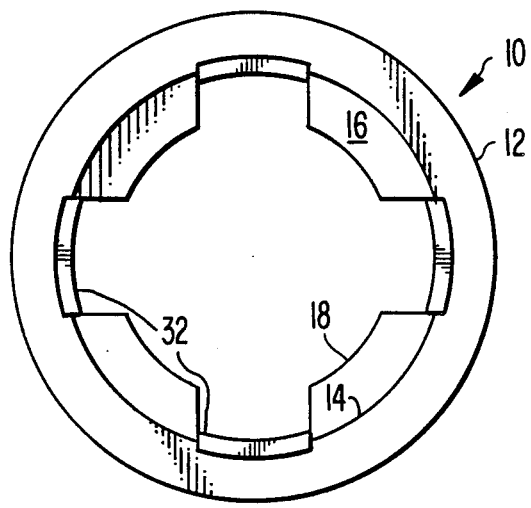
FIG. 3 is a left end elevation of the connector of FIG. 1.
Figure 4:
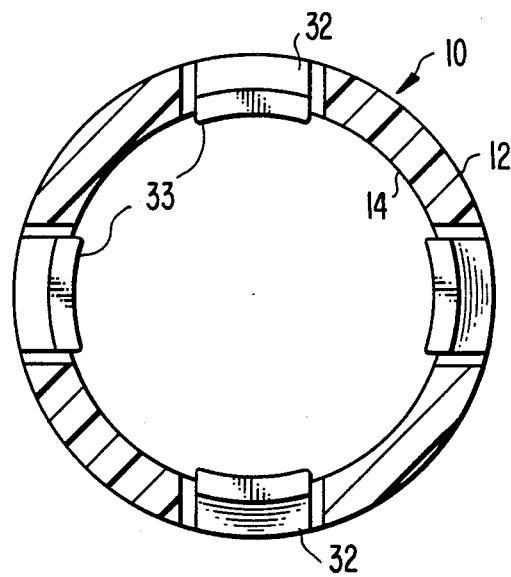
FIG. 4 is a transverse sectional view along line 4—4 of FIG. 1.

In the wall of sleeve 12 are four latch devices which are substantially identical to each other. Each latch structure is formed by a generally U-shaped slot 30, the legs of which point away from stop wall 16, leaving a latch tab 32. As best seen in FIGS. 2, 3, and 4, the sleeve wall in the area of latch tab 32 is about half the thickness of the remaining sleeve wall and each tab is formed so that, at rest, it inclines inwardly at an angle of approximately 25° relative to the adjacent sleeve surface so that the inner distal end of each tab protrudes inwardly beyond surface 14.

Figure 6:
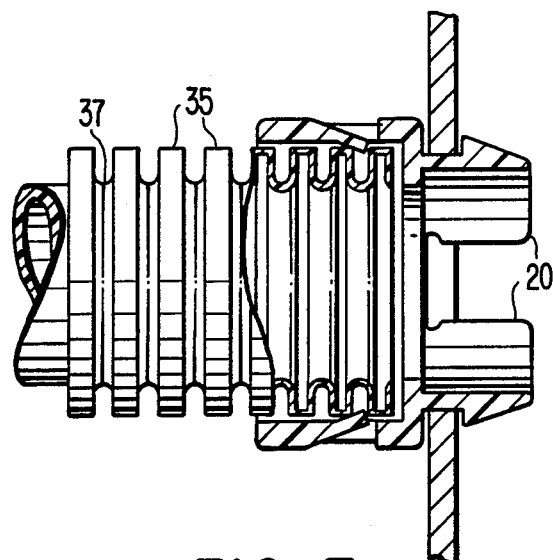
FIG. 6 is a longitudinal sectional view of the connector of FIGS. 1-5 showing a conduit latched therein.

As seen in FIG. 6, the non-metallic conduit with which the connector of the present invention is to be used has an outer surface characterized by a sequence of protruding annular rings 35 separated by V-shaped annular recesses 37. The conduit is constructed so that approximately 90 protruding rings 35 exist in a foot of conduit.

The separation between slot 30 and the inner surface of stop wall 16 is selected so that at least one ring at the end of a piece of conduit lies between the stop wall and the ends 33 of tabs 32. Thus, to join a piece of conduit to the connector, the conduit is simply pushed axially into the sleeve until its end abuts wall 16. Latch tabs 32 are sufficiently resilient so that all four of the tabs are elastically bent outwardly as each ring of the conduit passes and then snap in again as each recess 37 arrives. The conduit is then held against axial movement tending to remove the conduit from the sleeve.

The end of the connector having walls 20 can be pushed into an opening in a plastic or metal outlet or junction box having removable knockouts for this purpose either before or after the conduit is latched therein, inclined walls 24 causing the walls 20 to deform elastically inwardly until radial wall portions 26 arrive at the interior of the outlet box wall whereupon the walls 20 can again snap outwardly holding the connector in the outlet box wall. The conduit is then rigidly attached to the wall and the openings are aligned so that wires can extend from the interior of the conduit into the connection box.

The connector of the present invention is unitarily formed in a single molding operation from a thermoplastic which has suitable strength and insulating characteristics. A possible material for this purpose is a polymer known as noryl.

Figure 7:
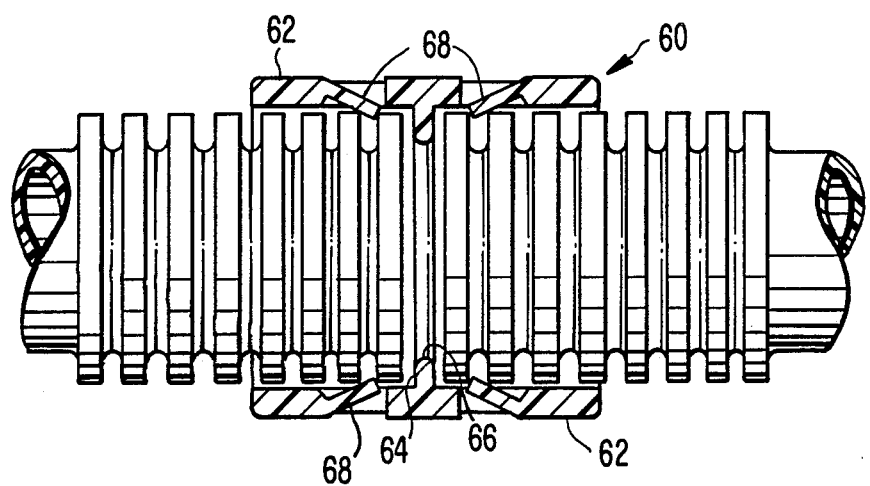
FIG. 7 is a side elevation, in longitudinal section, of a coupling device in accordance with the invention for coaxially connecting two sections of conduit.

FIG. 7 shows a side elevation, in section, of a connector using the same principles as the connector 10 discussed above but being configured to join two pieces of conduit end-to-end in a substantially coaxial relationship. As shown therein, the connector 60 has first and second sleeves 62 which are joined in coaxial relationship at a stop wall 64 which has a central opening 66. Each sleeve has a plurality of latch tabs 68 which are formed as shown and described in connection with FIGS. 1–6. The structure and functions of the various components are exactly as previously described and will not be repeated. To join the conduits, it is simply necessary to axially insert the conduits into opposite ends of the connector until the ends abut stop wall 64 whereupon latch tabs 68 engage the end rings of the conduits, holding them in position within the sleeve.

Figure 8:
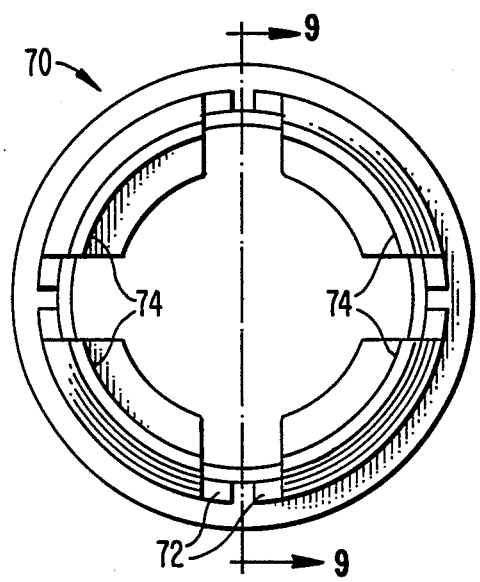
FIG. 8 is a right end elevation of a further embodiment of a connector in accordance with the invention.
Figure 10:
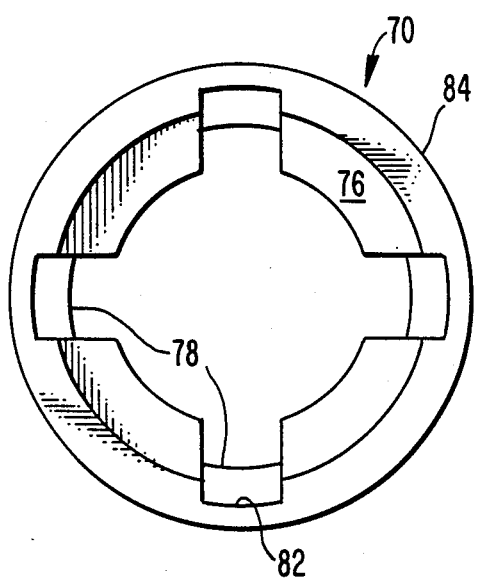
FIG. 10 is a left end elevation of the embodiment of FIGS. 8 and 9.
Figure 9:
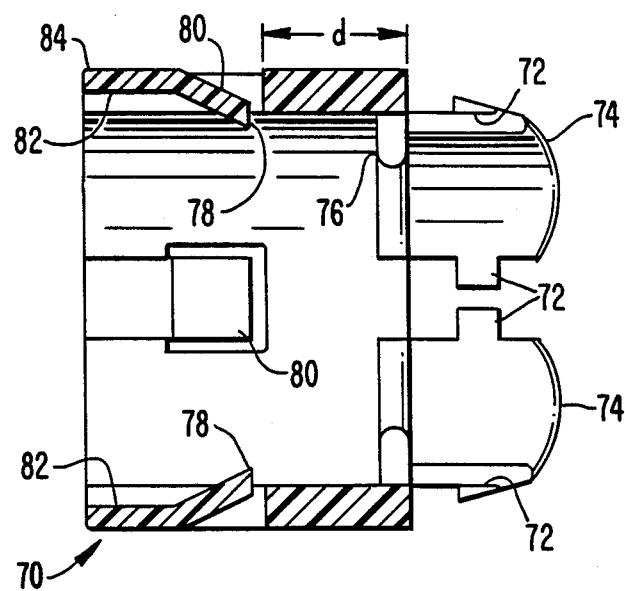
FIG. 9 is a transverse sectional view along line 9—9 of FIG. 8.

FIGS. 8–10 show a further embodiment of a connector in accordance with the invention which incorporates several improvements. While the basic structure is similar to that shown in FIGS. 1–6, the connector 70 of FIGS. 8–10 includes circularly extending tabs 72 which extend toward each other from the sides of axially extending walls 74. The ends of these tabs 72 are spaced from each other so that the resilient bending of walls 20 is not impaired. When installed in the wall of an outlet box, the tabs lie adjacent the inner edges of the knockout opening and act as a guard to prevent a wire jacket surrounding the cable wires from dragging or getting caught on the knockout edges and being cut.

As best seen in FIG. 9, the axial length of the connector has been increased by lengthening the distance d between the inner surface of stop wall 76 and the inner ends 78 of tabs 80. This permits at least two rings at the end of the conduit to enter the region d and assures latching of the conduit in the connector even if a portion of the end ring is damaged.

Finally, the wall regions 82 of wall 84 of the connector are made thinner than the remainder of the wall. Regions 82 are those portions which extend axially from tab 80 toward the open end of the connector. Those regions are made the same thickness as tabs 80 to facilitate the molding process.

As will be recognized, the connector of FIGS. 8–10 is used in the same manner as that of FIGS. 1–6. The end of a piece of conduit is inserted into the open end and pushed until it abuts the inner surface of wall 76. Latch tabs 80 snap into the recesses following the second ring from the end of the conduit. This can be done either before or after the connector is installed in a knockout opening.

While certain advantageous embodiments have been chosen to illustrate the invention, it will be understood by those skilled in the art that various changes and modifications can be made therein without departing from the scope of the invention as defined in the appended claims.

What is claimed is:

1. A connector for attaching non-metallic conduit to a wall or another conduit, the non-metallic conduit being of the type having an exterior surface characterized by a plurality of alternating annular protrusions and recesses, the connector comprising a cylindrical sleeve having an inner diameter slightly larger than the external diameter of the conduit and an axial length at least as great as the axial length occupied by three of said annular protrusions;

a stop wall at one end of said sleeve for limiting the insertion depth of said conduit into said sleeve, said stop wall having a central opening therethrough to permit the passage of wires from within said conduit;

a latch formed in said sleeve, said latch comprising means defining a generally U-shaped slot through the wall of said sleeve, the ends of said slot pointing axially away from said stop wall, said slot forming a resilient latch tab in the wall of said sleeve, said tab being inclined inwardly from the surrounding sleeve wall so that the distal end of said tab engages a protrusion at the end of a piece of inserted conduit and resists extraction of said conduit from said sleeve;

a plurality of hook members extending axially away from the other side of said stop wall from said sleeve, said hook members being formed to engage the edges of an opening in a substantially planar barrier, each of said hook members including an arcuate, axially extending resilient wall segment substantially concentric with said central opening in said stop wall, and a tooth formed on the exterior of said wall segment, said tooth having an inclined surface sloping outwardly away from the distal end of said arcuate wall segment and a radial surface facing said stop wall, said hook members together forming an annular recess to receive the wall of a junction box around an opening therethrough, each said arcuate wall segment being spaced from the next adjacent arcuate wall segment by a gap, said connector further comprising blocking means interposed between said wall segments adjacent each said gap for preventing a wire inserted through said connector from passing into any of said gaps and rubbing against an exposed portion of the edges of said opening in which said connector is installed to thereby minimize the possibility of damage to the insulation of said wire.

2. A connector according to claim 1 wherein each of said hook members includes a side wall facing generally toward a similar side wall of the next adjacent hook member, and wherein said blocking means includes a tab extending circularly from each said side wall toward a tab extending from the next adjacent side wall, the distal ends of said tabs being spaced from each other.

3. A connector for attaching non-metallic conduit to a wall or another conduit, the non-metallic conduit being of the type having an exterior surface characterized by a plurality of alternating annular protrusions and recesses, the connector comprising a cylindrical sleeve having an inner diameter slightly larger than the external diameter of the conduit and an axial length at least as great as the axial length occupied by three of said annular protrusions;

a stop wall at one end of said sleeve for limiting the insertion depth of said conduit into said sleeve, said stop wall having a central opening therethrough to permit the passage of wires from within said conduit;

a latch formed in said sleeve, said latch comprising means defining a generally U-shaped slot through the wall of said sleeve, the ends of said slot pointing axially away from said stop wall, said slot forming a resilient latch tab in the wall of said sleeve, said tab being inclined inwardly from the surrounding sleeve wall so that the distal end of said tab engages a protrusion at the end of a piece of inserted conduit and resists extraction of said conduit from said sleeve;

a plurality of hook members extending axially away from the other side of said stop wall from said sleeve, said hook members being formed to engage the edges of an opening in a substantially planar barrier, each of said hook members including an arcuate, axially extending resilient wall segment substantially concentric with said central opening in said stop wall, and a tooth formed on the exterior of said wall segment, said tooth having an inclined surface sloping outwardly away from the distal end of said arcuate wall segment and a radial surface facing said stop wall, said hook members together forming an annular recess to receive the wall of a junction box around an opening therethrough, each of said hook members further including a side wall facing generally toward a similar side wall of the next adjacent hook member, and a tab extending circularly from each said side wall toward a tab extending from the next adjacent side wall, the distal ends of said tabs being spaced from each other.

* * * * *